(12) United States Patent
Naito et al.

(10) Patent No.: US 9,625,033 B2
(45) Date of Patent: Apr. 18, 2017

(54) WORK VEHICLE

(71) Applicant: KOMATSU LTD., Tokyo (JP)

(72) Inventors: Makoto Naito, Komatsu (JP); Shinichi Naito, Yuuki (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/903,316

(22) PCT Filed: Jun. 18, 2014

(86) PCT No.: PCT/JP2014/066159
§ 371 (c)(1),
(2) Date: Jan. 7, 2016

(87) PCT Pub. No.: WO2015/025602
PCT Pub. Date: Feb. 26, 2015

(65) Prior Publication Data
US 2016/0144860 A1 May 26, 2016

(30) Foreign Application Priority Data

Aug. 20, 2013 (JP) .................. 2013-170213

(51) Int. Cl.
*F16H 61/00* (2006.01)
*F16H 61/16* (2006.01)
(Continued)

(52) U.S. Cl.
CPC ............. *F16H 61/16* (2013.01); *F16H 59/64* (2013.01); *F16H 61/02* (2013.01); *F16H 61/686* (2013.01);
(Continued)

(58) Field of Classification Search
None
See application file for complete search history.

(56) References Cited

U.S. PATENT DOCUMENTS

| 5,115,694 A | * | 5/1992 | Sasaki | ..................... F16H 59/72 |
| | | | | 475/117 |
| 6,120,408 A | * | 9/2000 | Yates, III | ................ F16H 48/08 |
| | | | | 192/82 T |

(Continued)

FOREIGN PATENT DOCUMENTS

| CN | 1740541 A | 3/2006 |
| JP | 4-127431 U | 11/1992 |

(Continued)

OTHER PUBLICATIONS

International Search Report for the corresponding international application No. PCT/JP2014/066159, issued on Sep. 16, 2014.

(Continued)

*Primary Examiner* — Dirk Wright
(74) *Attorney, Agent, or Firm* — Global IP Counselors, LLP

(57) ABSTRACT

A hydraulic oil supply circuit of a work vehicle is configured to supply hydraulic oil to a transmission. A hydraulic oil warming circuit is configured to warm up the hydraulic oil. A control unit is configured to control the transmission, the hydraulic oil supply circuit, and the hydraulic oil warming circuit. The transmission includes a hydraulic clutch and a clutch control valve. The clutch control valve is configured to control the pressure of the hydraulic oil supplied to the hydraulic clutch according to a command from the control unit. When the control unit determines that the temperature of the hydraulic oil is low, it is configured to output a warming up command for operation of a warming up function. The hydraulic oil warming circuit is configured to warm up the hydraulic oil by causing a pressure loss in a flow path for the hydraulic oil.

9 Claims, 7 Drawing Sheets

(51) Int. Cl.
*F16H 59/64* (2006.01)
*F16H 61/02* (2006.01)
*F16H 61/686* (2006.01)
*E02F 9/22* (2006.01)
*E02F 9/20* (2006.01)
*F16H 3/46* (2006.01)

(52) U.S. Cl.
CPC ...... *B60W 2710/1083* (2013.01); *E02F 9/202* (2013.01); *E02F 9/226* (2013.01); *E02F 9/2253* (2013.01); *F16H 3/46* (2013.01); *F16H 2200/2005* (2013.01)

(56) References Cited

U.S. PATENT DOCUMENTS

| | | | | |
|---|---|---|---|---|
| 7,267,633 B2 * | 9/2007 | Hitch | ............... | F02D 41/0225 192/3.24 |
| 7,874,226 B2 * | 1/2011 | Olson | ............... | F16H 57/0413 475/117 |
| 8,734,292 B2 * | 5/2014 | Koizumi | ............... | B60W 10/06 477/98 |
| 2005/0288150 A1 | 12/2005 | Hitch et al. | | |
| 2009/0105028 A1 | 4/2009 | Hiraki et al. | | |

FOREIGN PATENT DOCUMENTS

| | | |
|---|---|---|
| JP | 7-26588 A | 1/1995 |
| JP | 2001-159462 A | 6/2001 |
| JP | 2005-299699 A | 10/2005 |
| JP | 2006-41819 A | 2/2006 |
| JP | 2006-329244 A | 12/2006 |
| JP | 2009-236309 A | 10/2009 |
| JP | 2009-287676 A | 12/2009 |
| JP | 2010-25333 A | 2/2010 |
| JP | 2010-138924 A | 6/2010 |

OTHER PUBLICATIONS

Office Action for the corresponding Japanese application No. 2014-547607, issued on Apr. 14, 2015.
The Office Action for the corresponding Chinese application No. 201480041158.1, dated on Nov. 17, 2016.

* cited by examiner

| MODE | Lo | | Hi | |
|---|---|---|---|---|
| | L1 | L2 | H1 | H2 |
| MOTOR/GENERATOR MG1 | M | M | G | G |
| MOTOR/GENERATOR MG2 | G | G | M | M |
| MOTOR/GENERATOR MG3 | M | G | M | G |
| CLUTCH CL | O | O | X | X |
| CLUTCH CH | X | X | O | O |
| CLUTCH Cm1 | O | X | X | O |
| CLUTCH Cm2 | X | O | O | X |

WORK VEHICLE

CROSS-REFERENCE TO RELATED APPLICATIONS

This application is a U.S. National stage application of International Application No. PCT/JP2014/066159, filed on Jun. 18, 2014. This U.S. National stage application claims priority under 35 U.S.C. §119(a) to Japanese Patent Application No. 2013-170213, filed in Japan on Aug. 20, 2013, the entire contents of which are hereby incorporated herein by reference.

BACKGROUND

Field of the Invention

The present invention relates to a work vehicle.

Background Information

A work vehicle, such as a wheel loader or the like, which is equipped with a power transmission apparatus having a torque converter and a multi-stage transmission device (hereinafter termed a "torque converter type transmission device) has been publicly known (refer to Japanese Laid-Open Patent Publication 2010-138924). On the other hand, in recent years, instead of a torque converter type transmission device, an HMT (hydraulic-mechanical transmission device) and an EMT (electro-mechanical transmission device) have been publicly known as power transmission apparatuses (refer to Japanese Laid-Open Patent Publication 2006-041819).

SUMMARY

With a work vehicle having either a torque converter type transmission device or an HMT or an EMT, a clutch in the transmission is generally controlled by hydraulic pressure. Moreover, when the temperature of the hydraulic oil for the clutch becomes low, its viscosity becomes higher. At this time, the problem of deterioration in the responsiveness of the clutch occurs. In particular, when the work vehicle is started, the temperature of the hydraulic oil for the clutch has been lowered, so how to raise this hydraulic oil temperature is a problem.

The prior art work vehicle according to Japanese Laid-Open Patent Publication 2010-138924 solves the problem described above by relieving the hydraulic oil of the clutch to the torque converter when the work vehicle starts, and raising the hydraulic oil temperature by churning the hydraulic oil in the torque converter, then returning the warmed-up hydraulic oil to the hydraulic circuit of the clutch.

However, a work vehicle according to Japanese Laid-Open Patent Publication 2006-041819, which is equipped with an HMT or an EMT type power transmission apparatus, does not have a torque converter. Accordingly, how to raise the temperature of the hydraulic oil of the clutch without using a torque converter when the work vehicle starts is a problem.

The work vehicle according to one aspect of the present invention comprises a transmission, a hydraulic oil supply circuit, a hydraulic oil warming circuit, and a control unit. The transmission is configured to convert the driving force from the engine. The hydraulic oil supply circuit is configured to supply hydraulic oil to the transmission. The hydraulic oil warming circuit is configured to warm up the hydraulic oil. The control unit is configured to control the transmission, the hydraulic oil supply circuit, and the hydraulic oil warming circuit. The transmission includes a hydraulic clutch and a clutch control valve. The clutch control valve is configured to control a pressure of the hydraulic oil supplied to the hydraulic clutch according to a command from the control unit. When the control unit determines that the temperature of the hydraulic oil is low, the control unit is configured to output a warming up command to cause the warming up function to be performed. The hydraulic oil warming circuit is configured to warm up the hydraulic oil by causing a pressure loss in a flow path for the hydraulic oil.

The hydraulic oil supply circuit may include a connection circuit and a transmission pump. The hydraulic oil warming circuit may include a logic valve and a pilot circuit for the logic valve. The logic valve may include a P port and an R port. The connection circuit may be connected to the clutch control valve. The P port may be connected to a hydraulic circuit from the transmission pump. The R port may be connected to the connection circuit. Upon receipt of the warming up command, the hydraulic oil warming circuit may be configured to raise the hydraulic pressure in the pilot circuit, may be configured to generate a pressure difference between the hydraulic pressure at the P port and the hydraulic pressure at the R port, and may be configured to warm up the hydraulic oil by flowing the hydraulic oil from the P port to the R port using the pressure loss due to the pressure difference.

The hydraulic oil warming circuit may include a drain circuit, an auxiliary circuit, an electromagnetic valve, and a relief valve. The auxiliary circuit may be connected to the P port and to the pilot circuit. The electromagnetic valve may be configured to connect the auxiliary circuit with the drain circuit, or disconnect the auxiliary circuit from the drain circuit. The relief valve may be disposed between the pilot circuit and the drain circuit. Upon receipt of the warming up command, the electromagnetic valve may be configured to intercept a flow path to the drain circuit from the auxiliary circuit, and may be configured to raise the hydraulic pressure in the pilot circuit to the cracking pressure of the relief valve.

The hydraulic oil supply circuit may include an on-off valve. The hydraulic oil warming circuit may include a relief valve provided in parallel with the on-off valve. The on-off valve is configured to go into the off state upon receipt of the warming up command, thereby the hydraulic oil warming circuit may cause the hydraulic oil to flow to the hydraulic oil supply circuit via the relief valve.

The transmission may include a pressure switch configured to transmit a detection signal to the filling completion determination unit when the clutch pressure of the hydraulic clutch has reached a predetermined pressure. The filling completion determination unit may be configured to determine that the filling completed state is established when the detection signal is received.

The transmission may further include an input shaft, an output shaft, a gear mechanism, and a motor. The gear mechanism may include a planetary gear mechanism, and may be configured to transmit rotation of the input shaft to the output shaft. The motor may be connected to a rotating element of the planetary gear mechanism. The transmission may be configured such that the rotational speed ratio of the output shaft with respect to the input shaft is changed according to a change of the rotational speed of the motor.

With the work vehicle according to the above aspect of the present invention, a hydraulic oil warming circuit other than a torque converter warms up the hydraulic oil when the control unit determines that the temperature of the hydraulic oil is low. Consequently, even though this work vehicle is not equipped with a torque converter, it is still possible to raise the temperature of the hydraulic oil for the clutch when the work vehicle is started.

DESCRIPTION OF EXEMPLARY EMBODIMENTS

Figure 1:
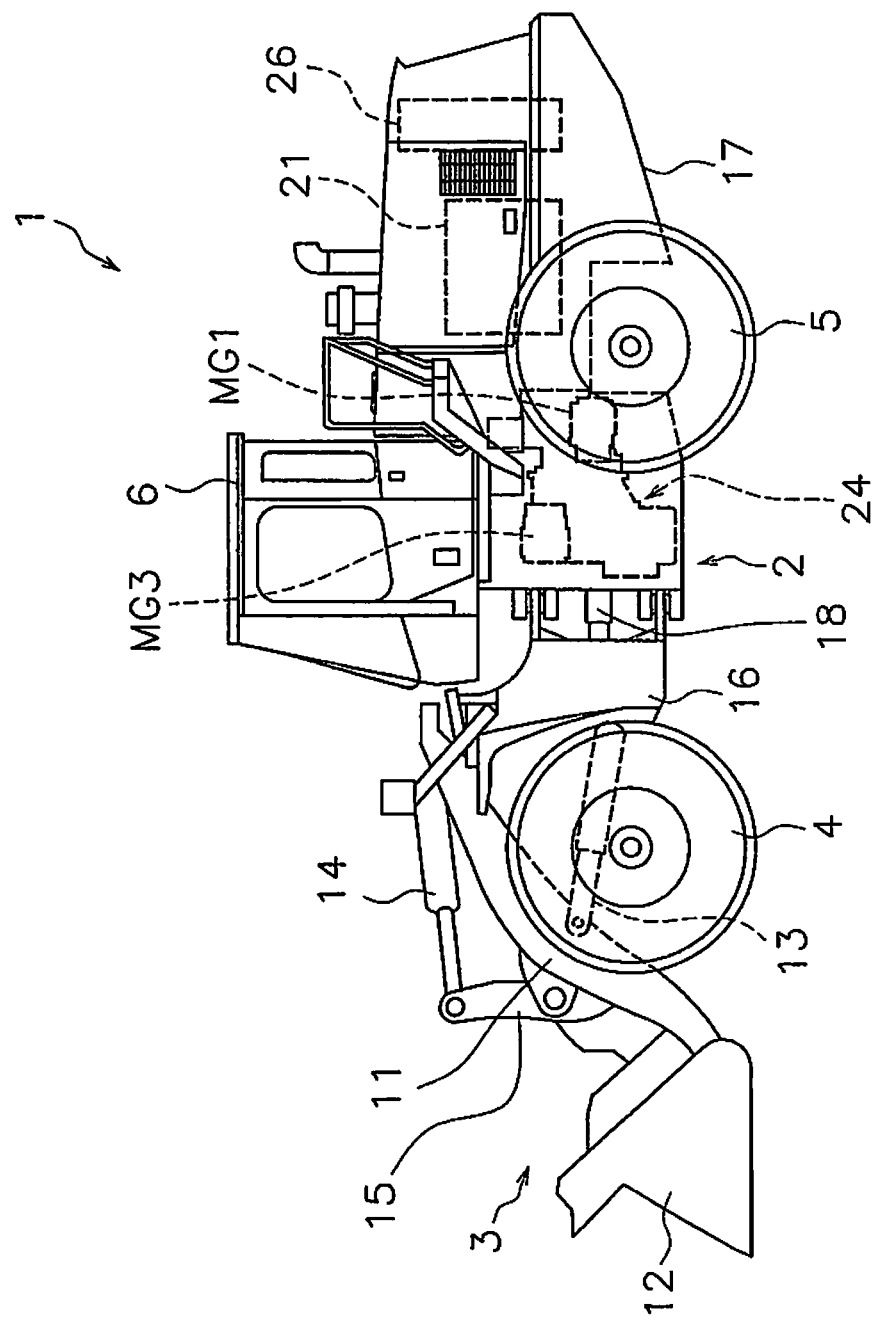
FIG. 1 is a side view of a work vehicle according to an exemplary embodiment of the present invention.

In the following, exemplary embodiments of the present invention will be explained with reference to the drawings. FIG. 1 is a side view of a work vehicle according to an exemplary embodiment of the present invention. This work vehicle 1 is, for example, a wheel loader. As shown in FIG. 1, the work vehicle 1 comprises a vehicle body frame 2, a working tool 3, traveling wheels 4 and 5, and a driving compartment 6. The work vehicle 1 is propelled by the traveling wheels 4 and 5 being rotationally driven. This work vehicle 1 can, for example, perform a task, such as excavation or the like, using the working tool 3.

The working tool 3 and the traveling wheels 4 and 5 are attached to the vehicle body frame 2. The working tool 3 is driven by hydraulic oil from a working tool pump 23 (refer to FIG. 2). The working tool 3 comprises a boom 11 and a bucket 12. The boom 11 is installed to the vehicle body frame 2. The working tool 3 also comprises a lift cylinder 13 and a bucket cylinder 14. The lift cylinder 13 and the bucket cylinder 14 are hydraulic pressure cylinders. One end of the lift cylinder 13 is attached to the vehicle body frame 2. The other end of the lift cylinder 13 is attached to the boom 11. The boom 11 is raised up and lowered down by the lift cylinder 13 extending and retracting using the hydraulic oil from the working tool pump 23. The bucket 12 is attached to the end of the boom 11. One end of the bucket cylinder 14 is attached to the vehicle body frame 2. The other end of the bucket cylinder is attached to the bucket 12 via a bell crank 15. The bucket 12 is raised up and lowered down by the bucket cylinder 14 extending and retracting using the hydraulic oil from the working tool pump 23.

The driver compartment 6 and the traveling wheels 5 are attached to the vehicle body frame 2. The driver compartment 6 is mounted upon the vehicle body frame 2. A seat upon which the operator sits and operation devices and so on that will be described hereinafter are disposed within the driver compartment 6. The vehicle body frame 2 includes a front frame 16 and a rear frame 17. The front frame 16 and the rear frame 17 are attached together to be capable of pivoting left and right with respect to one another.

The working tool 3 is fitted to the front frame 16. The driver compartment 6 is mounted to the rear frame 17. Moreover, devices that will be described hereinafter are mounted to the rear frame 17, including an engine 21, a transmission 24, a cooling device 26 and so on. The transmission 24 is positioned in front of the engine 21. The cooling device 26 is positioned behind the engine 21. The cooling device 26 includes a radiator for cooling the coolant fluid of the engine 21.

The work vehicle 1 also comprises a steering cylinder 18. This steering cylinder 18 is attached both to the front frame 16 and to the rear frame 17. The steering cylinder 18 is a hydraulic pressure cylinder. Due to the steering cylinder 18 being extended and retracted by hydraulic oil supplied from a steering pump 30 that will be described hereinafter, the progression direction of the work vehicle 1 can be changed to the left and to the right.

Figure 2:
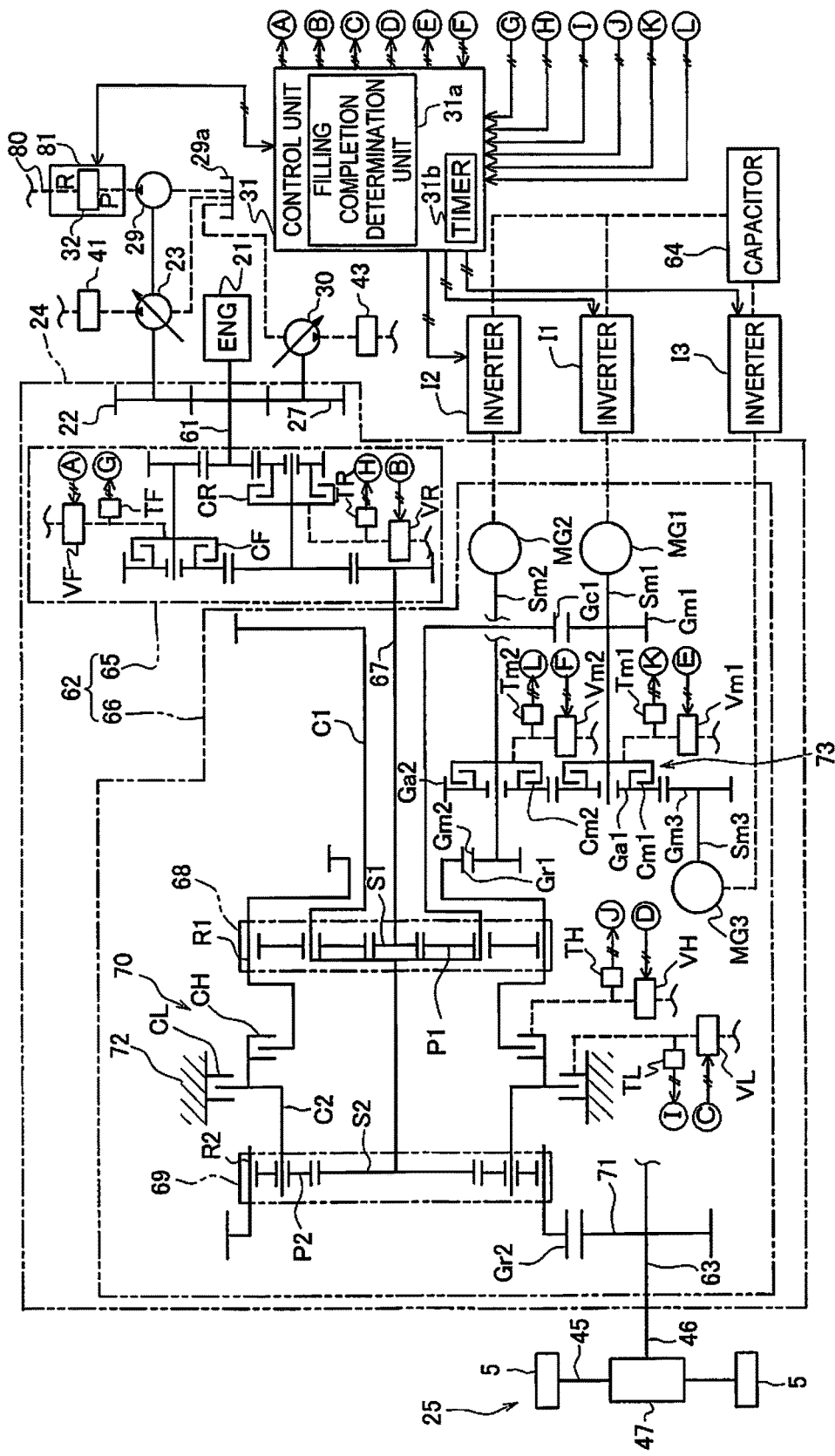
FIG. 2 is a schematic view showing the structure of this work vehicle.

FIG. 2 is a schematic figure showing the structure of the work vehicle 1. As shown in FIG. 2, the work vehicle 1 comprises the engine 21, the working tool pump 23, a transmission pump 29, the steering pump 30, the transmission 24, a propulsion apparatus 25, and so on.

The engine 21 may, for example, be a diesel engine. The engine 21 generates driving force for driving the propulsion apparatus 25, the working tool pump 23, the transmission pump 29, the steering pump 30, and so on.

The working tool pump 23, the transmission pump 29, and the steering pump 30 are hydraulic pressure pumps. The hydraulic oil discharged from these hydraulic pressure pumps is stored in a hydraulic oil tank 29a. The working tool pump 23, the transmission pump 29, and the steering pump 30 are driven by driving force from the engine 21.

The working tool pump 23 is a variable capacity type hydraulic pressure pump. The hydraulic oil that is discharged from the working tool pump 23 is supplied to the lift cylinder 13 and to the bucket cylinder 14 described above via a working tool control valve 41.

The transmission pump 29 is a fixed capacity type hydraulic pressure pump. The hydraulic oil discharged from the transmission pump 29 is supplied, via a logic valve 32 and clutch control valves VF, VR, VL, VH, Vm1, and Vm2 the details of which will be described hereinafter, to clutches CF, CR, CL, CH, Cm1, and Cm2 (the details of which will likewise be described hereinafter) of the transmission 24. The logic valve 32 has a P port and an R port. In this exemplary embodiment, the hydraulic circuit from the hydraulic oil tank 29a via the transmission pump 29 and the logic valve 32 to the clutches CF, CR, CL, CH, Cm1, and Cm2 is termed the "hydraulic oil circuit 80". This hydraulic oil supply circuit 80 supplies hydraulic oil to the transmission 24.

A hydraulic oil warming circuit 81 is connected to the hydraulic oil supply circuit 80. This hydraulic oil warming circuit 81 warms up the hydraulic oil by causing the hydraulic oil to undergo a pressure loss. The details of the hydraulic oil supply circuit 80 and of the hydraulic oil warming circuit 81 will be described hereinafter.

The steering pump 30 is a variable capacity type hydraulic pressure pump. The hydraulic oil that has been discharged from the steering pump 30 is supplied to the steering cylinder 18 described above via a steering control valve 43.

The transmission 24 transmits driving force from the engine 21 to the propulsion apparatus 25. The transmission 24 outputs the driving force from the engine 21 while changing the speed thereof. The details of the structure of this transmission 24 will be explained hereinafter.

The propulsion apparatus 25 is driven by the engine 21. This propulsion apparatus 25 comprises a transmission shaft 46, axle shafts 45, and the traveling wheels 5 described above. The transmission shaft 46 transmits driving force from the transmission 24 to the axle shafts 45. These axle shafts 45 extend in the transverse direction of the vehicle, and are connected to the traveling wheels 5. The axle shafts 45 thus transmit driving force from the transmission 24 to the traveling wheels 5. Due to this, the traveling wheels 5 are rotated.

Next, the details of the structure of the transmission 24 will be explained. The transmission 24 comprises an input shaft 61, a first power extraction mechanism 22 (hereinafter termed the "first PTO 22"), a second power extraction mechanism 27 (hereinafter termed the "second PTO 27"), a gear mechanism 62, an output shaft 63, a first motor MG1, a second motor MG2, and a third motor MG3.

Rotation is inputted from the engine 21 to the input shaft 61. The gear mechanism 62 transmits the rotation of its input shaft 61 to its output shaft 63. The output shaft 63 is connected to the propulsion apparatus described above, and transmits rotation from the gear mechanism 62 to the propulsion apparatus 25.

The first PTO 22 is connected to the input shaft 61, and transmits a portion of the driving force from the engine 21 to the working tool pump 23 and to the transmission pump 29. The second PTO 27 is connected to the input shaft 61 in parallel with the first PTO 22, and transmits a portion of the driving force from the engine 21 to the steering pump 30.

The gear mechanism 62 is a mechanism that transmits the driving force from the engine 21. This gear mechanism 62 is configured such that the rotational speed ratio of its output shaft 63 with respect to its input shaft 61 is changed according to changes of the rotational speeds of the motors MG1, MG2, and MG3. The gear mechanism 62 comprises an FIR changeover mechanism 65 and a transmission device 66.

The F/R changeover mechanism 65 comprises a forward clutch CF, a reverse clutch CR, a forward clutch control valve VF, a reverse clutch control valve VR, and gears of various types. The forward clutch CF and the reverse clutch CR are hydraulic clutches. Hydraulic oil is supplied from the transmission pump 29 to both of the clutches CF and CR. The pressures of these supplies of hydraulic oil to the clutches CF and CR are controlled by the clutch control valves VF and VR, respectively. Pressure switches TF and TR may be provided to the clutches CF and CR. In other words, the transmission 24 may further include the pressure switches TF and TR. These pressure switches TF and TR transmit detection signals to a control unit 31 when their respective clutch pressures reach predetermined pressures. In more detail, the pressure switches TF and TR output detection signals to a filling completion determination unit 31a (the details of which will be described hereinafter) when their respective clutch pressures have reached the predetermined pressures. Respective values are set for these set pressures corresponding to the pressures of the supplies of hydraulic oil to the clutches CF and CR when filling thereof has been completed (i.e. corresponding to their respective clutch full pressures). Accordingly, the pressure switches TF and TR output their detection signals to the control unit 31 when they detect that the filling of their respective clutches has been completed. The direction of the rotation outputted from the F/R changeover mechanism 65 is changed by the connection or disconnection of the forward clutch CF and the connection or disconnection of the reverse clutch CR being changed over.

The transmission device 66 comprises an intermediate shaft 67, a first planetary gear mechanism 68, a second planetary gear mechanism 69, a Hi/Lo changeover mechanism 70, and an output gear 71. The intermediate shaft 67 is linked to the F/R changeover mechanism 65. And the first planetary gear mechanism 68 and the second planetary gear mechanism 69 are disposed coaxially with the intermediate shaft 67.

The first planetary gear mechanism 68 comprises a first sun gear S1, a plurality of first planet gears P1, a first carrier C1 that supports the plurality of first planet gears P1, and a first ring gear R1. The first sun gear S1 is linked to the intermediate shaft 67. The plurality of first planet gears P1 are meshed with the first sun gear S1, and are rotatably supported by the first carrier C1. A first carrier gear Gc1 is provided upon the external circumferential portion of the first carrier C1. The first ring gear R1 is meshed with the plurality of planet gears P1, and is capable of rotating. Moreover, a first external circumferential ring gear Gr1 is provided upon the external circumference of the first ring gear R1.

The second planetary gear mechanism 69 comprises a second sun gear S2, a plurality of second planet gears P2, a second carrier C2 that supports the plurality of second planet gears P2, and a second ring gear R2. The second sun gear S2 is linked to the first carrier C1. The plurality of second planet gears P2 are meshed with the second sun gear S2, and are rotatably supported by the second carrier C2. The second ring gear R2 is meshed with the plurality of planet gears P2, and is capable of rotating. A second external circumferential ring gear Gr2 is provided upon the external circumference of the second ring gear R2. This second external circumferential ring gear Gr2 is meshed with the output gear 71, and thereby the rotation of the second ring gear R2 is outputted to the output shaft 63 via the output gear 71.

The Hi/Lo changeover mechanism 70 is a mechanism for changing over the driving force transmission path of the transmission 24 between a high speed mode (the Hi mode) in which the speed of the vehicle is high and a low speed mode (the Lo mode) in which the speed of the vehicle is low. This Hi/Lo changeover mechanism 70 includes the Hi clutch CH that is operated to ON during the Hi mode, the Lo clutch CL that is operated to ON during the Lo mode, the Hi clutch control valve VH, and the Lo clutch control valve VL. The Hi clutch CH connects the first ring gear R1 and the second carrier C2 together or disconnects them from one another. Moreover, the Lo clutch CL connects the second carrier C2 to a fixed point 72 or disconnects it therefrom, thus respectively prohibiting or permitting the rotation of the second carrier C2.

It should be understood that the clutches CH and CL are hydraulic clutches, and that hydraulic oil is supplied to both of these clutches CH and CL from the transmission pump 29. The pressures of these supplies of hydraulic oil to the clutches CH and CL are controlled by the clutch control valves VH and VL, respectively. Pressure switches TH and TL may be provided to the clutches CH and CL, respectively. In other words, the transmission 24 may further include the pressure switches TH and TL. These pressure switches TH and TL transmit detection signals to the control unit 31 when their respective clutch pressures reach predetermined pressures. In more detail, the pressure switches TH and TL transmit detection signals to the filling completion determination unit 31a (the details of which will be described hereinafter) when their respective clutch pressures have reached the predetermined pressures. Respective values are set for these set pressures corresponding to the pressures of the supplies of hydraulic oil to the clutches CH and CL when filling thereof has been completed (i.e. corresponding to their respective clutch full pressures). Accordingly, the pressure switches TH and TL output their detection signals to the control unit 31 when they detect that the filling of their respective clutches has been completed.

The first motor MG1, the second motor MG2, and the third motor MG3 function as drive motors that generate driving force using electrical energy. Moreover, the first motor MG1, the second motor MG2, and the third motor MG3 also can function as generators that generate electrical energy by using driving force that is inputted thereto.

A first motor gear Gm1 is fixed to a rotation shaft Sm1 of the first motor MG1. This first motor gear Gm1 is meshed with the first carrier gear Gc1. In other words, the first motor MG1 is connected to a rotating element of the first planetary gear mechanism 68. A second motor gear Gm2 is fixed to a rotation shaft Sm2 of the second motor MG2. This second motor gear Gm2 is meshed with the first external circumferential ring gear Gr1. In other words, the second motor MG2 is connected to a rotating element of the first planetary gear mechanism 68.

Moreover, the third motor MG3 assists the first motor MG1 and the second motor MG2. The transmission device 66 comprises a motor changeover mechanism 73, and this motor changeover mechanism 73 selectively changes over the subject of assistance by the third motor MG3 between the first motor MG1 and the second motor MG2.

In detail, the motor changeover mechanism 73 comprises the first motor clutch Cm1, the second motor clutch Cm2, a first motor clutch control valve Vm1, a second motor clutch control valve Vm2, a first connecting gear Ga1, and a second connecting gear Ga2. A third motor gear Gm3 is connected to a rotation shaft Sm3 of the third motor MG3, and this third motor gear Gm3 is meshed with the first connecting gear Ga1. The first motor clutch Cm1 changes over the connection or disconnection of the rotation shaft Sm1 of the first motor MG1 and the first connecting gear Ga1. The first connecting gear Ga1 is meshed with the second connecting gear Ga2. The second motor clutch Cm2 changes over the connection or disconnection of the rotation shaft Sm2 of the second motor MG2 and the second connecting gear Ga2. Due to one or the other of the first motor clutch Cm1 and the second motor clutch Cm2 being connected, as a result the third motor MG3 is connected to some rotating element of the first planetary gear mechanism 68.

The first motor clutch Cm1 and the second motor clutch Cm2 are hydraulic clutches. Hydraulic oil is supplied from the transmission pump 29 to both of the clutches Cm1 and Cm2. The pressures of these supplies of hydraulic oil to the clutches Cm1 and Cm2 are controlled by clutch control valves Vm1 and Vm2, respectively. Pressure switches Tm1 and Tm2 may be provided to the clutches Cm1 and Cm2. In other words, the transmission 24 may further include the pressure switches Tm1 and Tm2. These pressure switches Tm1 and Tm2 transmit detection signals to the control unit 31 when their respective clutch pressures reach predetermined pressures. In more detail, the pressure switches Tm1 and Tm2 transmit detection signals to the filling completion determination unit 31a (the details of which will be described hereinafter) when their respective clutch pressures have reached the predetermined pressures. Respective values are set for these set pressures corresponding to the pressures of the supplies of hydraulic oil to the clutches Cm1 and Cm2 when filling thereof has been completed (i.e., corresponding to their respective clutch full pressures). Accordingly, the pressure switches Tm1 and Tm2 output their detection signals to the control unit 31 when they detect that the filling of their respective clutches has been completed.

In the state in which the first motor clutch Cm1 is connected while the second motor clutch Cm2 is disconnected, the third motor gear Gm3 assists the first motor MG1. In the state in which the second motor clutch Cm2 is connected while the first motor clutch Cm1 is disconnected, the third motor gear Gm3 assists the second motor MG2.

The first motor MG1 is connected to a capacitor 64 via the first inverter I1. The second motor MG2 is connected to the capacitor 64 via the second inverter I2. Moreover, the third motor MG3 is connected to the capacitor 64 via the third inverter I3.

The capacitor 64 functions as an energy accumulation unit that accumulates energy generated by the motors MG1, MG2, and MG3. In other words, the capacitor 64 accumulates electrical power generated by the motors MG1, MG2, and MG3 when the total amount of electrical power generated by the motors MG1, MG2, and MG3 is relatively large. Furthermore, the capacitor 64 discharges electrical power when the total amount of electrical power consumed by the motors MG1, MG2, and MG3 is relatively large. In other words, the motors MG1, MG2, and MG3 are driven by electrical power that has been accumulated in the capacitor 64. It should be understood that, instead of a capacitor, it would also be possible to employ a battery as the electricity storage means.

The work vehicle 1 includes the control unit 31. This control unit 31 supplies command signals to respective inverters I1, I2, and I3 specifying command torques for the motors MG1, MG2, and MG3. By doing this, the control unit 31 controls the transmission 24. Moreover, the control unit 31 supplies command signals for controlling the clutch hydraulic pressures of the clutches CF, CR, CH, CL, Cm1, and Cm2 to the respective clutch control valves VF, VR, VH, VL, Vm1, and Vm2. The clutch control valves VF, VR, VH, VL, Vm1, and Vm2 operate according to these command signals. By doing this, the control unit 31 controls the transmission 24 and the hydraulic oil supply circuit 80. The clutch control valves VF, VR, VH, VL, Vm1, and Vm2 include a plurality of valves for controlling the clutches CF, CR, CH, CL, Cm1, and Cm2.

The gear ratio and the output torque of the transmission 24 are controlled by the motors MG1, MG2, and MG3 and the clutches CF, CR, CH, CL, Cm1, and Cm2 being controlled by command signals from the command unit 31. The operation of the transmission 24 will now be explained in the following.

Figures 3, 4:
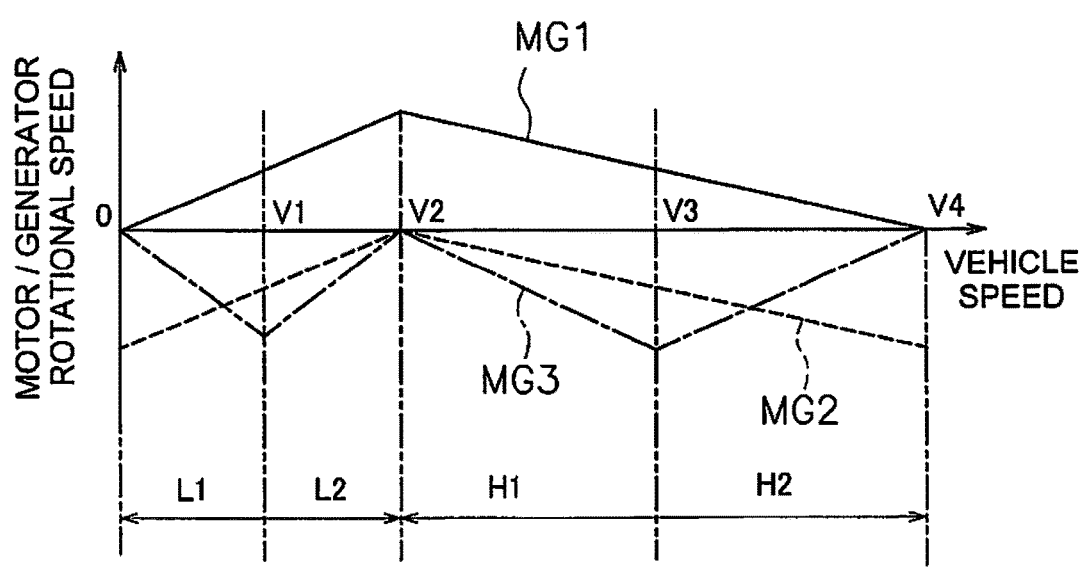
FIG. 3 is a table showing the states of functioning of first through third motors and of clutches.
FIG. 4 is a figure showing changes of the rotational speeds of the first through third motors according to vehicle speed.

The schematic operation of the transmission 24 when the vehicle speed accelerates from zero in the forward direction with the rotational speed of the engine 21 being held constant will now be explained with reference to FIG. 3 and FIG. 4. FIG. 3 shows the functions of the motors MG1, MG2, and MG3 and the states of the clutches in each mode. The Lo mode includes an L1 mode and an L2 mode. The Hi mode includes an H1 mode and an H2 mode. In FIG. 3, "M" means that the corresponding one of the motors MG1, MG2, and MG3 is functioning as a drive motor. Moreover, "G" means that the corresponding one of the motors MG1, MG2, and MG3 is functioning as a generator. "O" means that the corresponding clutch is in the connected state. Moreover, "X" means that the corresponding clutch is in the disconnected state.

FIG. 4 shows the rotational speeds of the motors MG1, MG2, and MG3 with respect to vehicle speed. When the rotational speed of the engine 21 is constant, the vehicle speed changes according to the rotational speed ratio of the transmission 24. The rotational speed ratio is the ratio of the rotational speed of the output shaft 63 to the rotational speed of the input shaft 61. Accordingly, the changes of vehicle speed in FIG. 4 agree with the changes of the rotational speed ratio of the transmission 24. In other words, FIG. 4 shows the relationships between the rotational speeds of the motors MG1, MG2, and MG3 and the rotational speed ratio of the transmission 24. In FIG. 4, the solid line represents the rotational speed of the first motor MG1, the broken line represents the rotational speed of the second motor MG2, and the single dotted broken line represents the rotational speed of the third motor MG3.

In the region in which the vehicle speed is greater than or equal to zero and less than V1, the Lo clutch CL is connected, the Hi clutch CH is disconnected, the first motor clutch Cm1 is connected, and the second motor clutch Cm2 is disconnected (this is the L1 mode). Since the Hi clutch CH is disconnected, accordingly the second carrier C2 and the first ring gear R1 are disconnected. Since the Lo clutch CL is connected, the second carrier C2 is fixed. Moreover, the first connecting gear Ga1 is connected to the rotation shaft Sm1 of the first motor MG1, while the second connecting gear Ga2 is disconnected from the rotation shaft Sm2 of the second motor MG2. Due to this, the third motor MG3 and the first motor MG1 are connected together via the third motor gear Gm3, the first connecting gear Ga1, and the first motor clutch Cm1. Moreover the third motor MG3 is disconnected from the second motor MG2, since the second motor clutch CM2 is disconnected.

In this L1 mode, the driving force of the engine 21 is inputted to the first sun gear S1 via the intermediate shaft 67, and this driving force is outputted from the first carrier C1 to the second sun gear S2. On the other hand, the driving force inputted to the first sun gear S1 is transmitted from the first planet gears P1 to the first ring gear R1, and is outputted to the second motor MG2 via the first external circumferential ring gear Gr1 and the second motor gear Gm2. In this L1 mode, the second motor MG2 primarily functions as a generator, and a part of the electrical power generated by this second motor MG2 is accumulated in the capacitor 64.

Furthermore, in this L1 mode, the first motor MG1 and the third motor MG3 primarily function as electrically driven motors. The driving force from the first motor MG1 and the third motor MG3 is outputted to the second sun gear S2 via the path: the first motor gear Gm1→the first carrier gear Gc1→the first carrier C1. As described above, the driving force outputted to the second sun gear S2 is transmitted to the output shaft 63 via the path: the second planet gears P2→the second ring gear R2→the second external circumferential ring gear Gr2→the output gear 71.

In the region in which the vehicle speed is greater than or equal to V1 and less than V2, the Lo clutch CL is connected, the Hi clutch CH is disconnected, the first motor clutch Cm1 is disconnected, and the second motor clutch Cm2 is connected (this is the L2 mode). Accordingly, the second connecting gear Ga2 is connected to the rotation shaft Sm2 of the second motor MG2, while the first connecting gear Ga1 is disconnected from the rotation shaft Sm1 of the first motor MG1. Due to this, the third motor MG3 and second motor MG2 are connected together via the third motor gear Gm3, the first connecting gear Ga1, and the second motor clutch Cm2. Moreover the third motor MG3 is disconnected from the first motor MG1, since the first motor clutch CM1 is disconnected.

In this L2 mode, the driving force of the engine 21 is inputted to the first sun gear S1 via the intermediate shaft 67, and this driving force is outputted from the first carrier C1 to the second sun gear S2. On the other hand, the driving force inputted to the first sun gear S1 is transmitted from the first planet gears P1 to the first ring gear R1, and is outputted to the second motor MG2 via the first external circumferential ring gear Gr1 and the second motor gear Gm2. Moreover, driving force is outputted to the third motor MG3 from the second motor gear Gm2 via the second motor clutch Cm2, the second connecting gear Ga2, the first connecting gear Ga1, and the third motor gear Gm3. In this L2 mode, the second motor MG2 and the third motor MG3 primarily function as generators, and portions of the electrical power generated by this second motor MG2 and of the electrical power generated by the third motor MG3 are accumulated in the capacitor 64.

Furthermore, in this L2 mode, the first motor MG1 primarily functions as an electrically driven motor. The driving force from the first motor MG1 is outputted to the second sun gear S2 via the path: the first motor gear Gm1→the first carrier gear Gc1→the first carrier C1. As described above, the driving force outputted to the second sun gear S2 is transmitted to the output shaft 63 via the path: the second planet gears P2→the second ring gear R2→the second external circumferential ring gear Gr2→the output gear 71.

In the region in which the vehicle speed is greater than or equal to V2 and less than V3, the Lo clutch CL is disconnected, the Hi clutch CH is connected, the first motor clutch Cm1 is disconnected, and the second motor clutch Cm2 is connected (this is the H1 mode). In this H1 mode, since the Hi clutch CH is connected, accordingly the second carrier C2 and the first ring gear R1 are connected. Moreover the second carrier C2 is released, since the Lo clutch CL is disconnected. Accordingly, the rotational speeds of the first ring gear R1 and the second carrier C2 are the same. Moreover, the second connecting gear Ga2 is connected to the rotation shaft Sm2 of the second motor MG2, while the first connecting gear Ga1 is disconnected from the rotation shaft Sm1 of the first motor MG1. Due to this, the third motor MG3 and the second motor MG2 are connected together via the third motor gear Gm3, the first connecting gear Ga1, and the second motor clutch Cm2. Moreover the third motor MG3 is disconnected from the first motor MG1, since the first motor clutch CM1 is disconnected.

In this H1 mode, the driving force of the engine 21 is inputted to the first sun gear S1, and this driving force is outputted from the first carrier C1 to the second sun gear S2. Moreover, the driving force inputted to the first sun gear S1 is outputted from the first carrier C1 to the first motor MG1 via the first carrier gear Gc1 and the first motor gear Gm1. In this H1 mode, since the first motor MG1 primarily functions as a generator, accordingly a part of the electrical power generated by this first motor MG1 is accumulated in the capacitor 64.

Furthermore, in this H1 mode, the second motor MG2 and the third motor MG3 primarily function as electrically driven motors. The driving force of the third motor MG3 is transmitted from the third motor gear Gm3 to the rotation shaft of the second motor MG2 via the first connecting gear Ga1, the second connecting gear Ga2, and the second motor clutch Cm2. The driving force of the second motor MG2 and the driving force of the third motor MG3 are outputted to the second carrier C2 via the path: the second motor gear Gm2→the first external circumferential ring gear Gr1→the first ring gear R1→the Hi clutch CH. Along with the driving force outputted to the second sun gear S2 being outputted to the second ring gear R2 via the second planet gears P2 as described above, also the driving force outputted to the second carrier C2 is outputted to the second ring gear R2 via the second planet gears P2. The driving force supplied in this manner to the second ring gear R2 is transmitted to the output shaft 63 via the second external circumferential ring gear Gr2 and the output gear 71.

In the region in which the vehicle speed is greater than or equal to V3 and less than V4, the Lo clutch CL is disconnected, the Hi clutch CH is connected, the first motor clutch Cm1 is connected, and the second motor clutch Cm2 is disconnected (this is the H2 mode). In this H2 mode, the first connecting gear Ga1 is connected to the rotation shaft Sm1 of the first motor MG1, while the second connecting gear Ga2 is disconnected from the rotation shaft Sm2 of the second motor MG2. Due to this, the third motor MG3 and the first motor MG1 are connected together via the third motor gear Gm3, the first connecting gear Ga1, and the first motor clutch Cm1. Moreover the third motor MG3 is disconnected from the second motor MG2, since the second motor clutch CM2 is disconnected.

In this H2 mode, the driving force of the engine 21 is inputted to the first sun gear S1, and this driving force is outputted from the first carrier C1 to the second sun gear S2. Moreover, the driving force inputted to the first sun gear S1 is outputted from the first carrier C1 via the first carrier gear Gc1 and the first motor gear Gm1 to the first motor MG1 and to the third motor MG3. Driving force is outputted to the third motor MG3 from the second motor gear Gm2 via the second motor clutch Cm2, the second connecting gear Ga2, the first connecting gear Ga1, and the third motor gear Gm3. In this H2 mode, since the first motor MG1 and the third motor MG3 primarily function as generators, accordingly portions of the electrical power generated by this first motor MG1 and of the electrical power generated by the third motor MG3 are accumulated in the capacitor 64.

Furthermore, in this H2 mode, the second motor MG2 primarily functions as an electrically driven motor. The driving force from the second motor MG2 is outputted to the second carrier C2 via the path: the second motor gear Gm2→the first external circumferential ring gear Gr1→the first ring gear R1→the Hi clutch CH. Along with the driving force outputted to the second sun gear S2 being outputted to the second ring gear R2 via the second planet gears P2 as described above, also the driving force outputted to the second carrier C2 is outputted to the second ring gear R2 via the second planet gears P2. The driving force supplied in this manner to the second ring gear R2 is transmitted to the output shaft 63 via the second external circumferential ring gear Gr2 and the output gear 71.

It should be understood that while, in the above, the case of forward propulsion has been explained, similar operation takes place in the case of reverse propulsion as well.

Returning to FIG. 2, the control unit 31 includes the filling completion determination unit 31a and a timer 31b. This filling completion determination unit 31a determines whether or not a filling completed state that the hydraulic oil has been completely filled into the hydraulic chambers of the hydraulic clutches CF, CR, CH, CL, Cm1, and Cm2 is established. The detection signals from the pressure switches TF, TR, TH, TL, Tm1, and Tm2 are transmitted to the filling completion determination unit 31a. The timer 31b measures the time interval, after a gearshift command or after output of command current to the clutch control valves VF, VR, VH, VL, Vm1, and Vm2, until the respective filling completed state is established. The details of the operation of the filling completion determination unit 31a and of the timer 31b will be described hereinafter.

Figure 5:
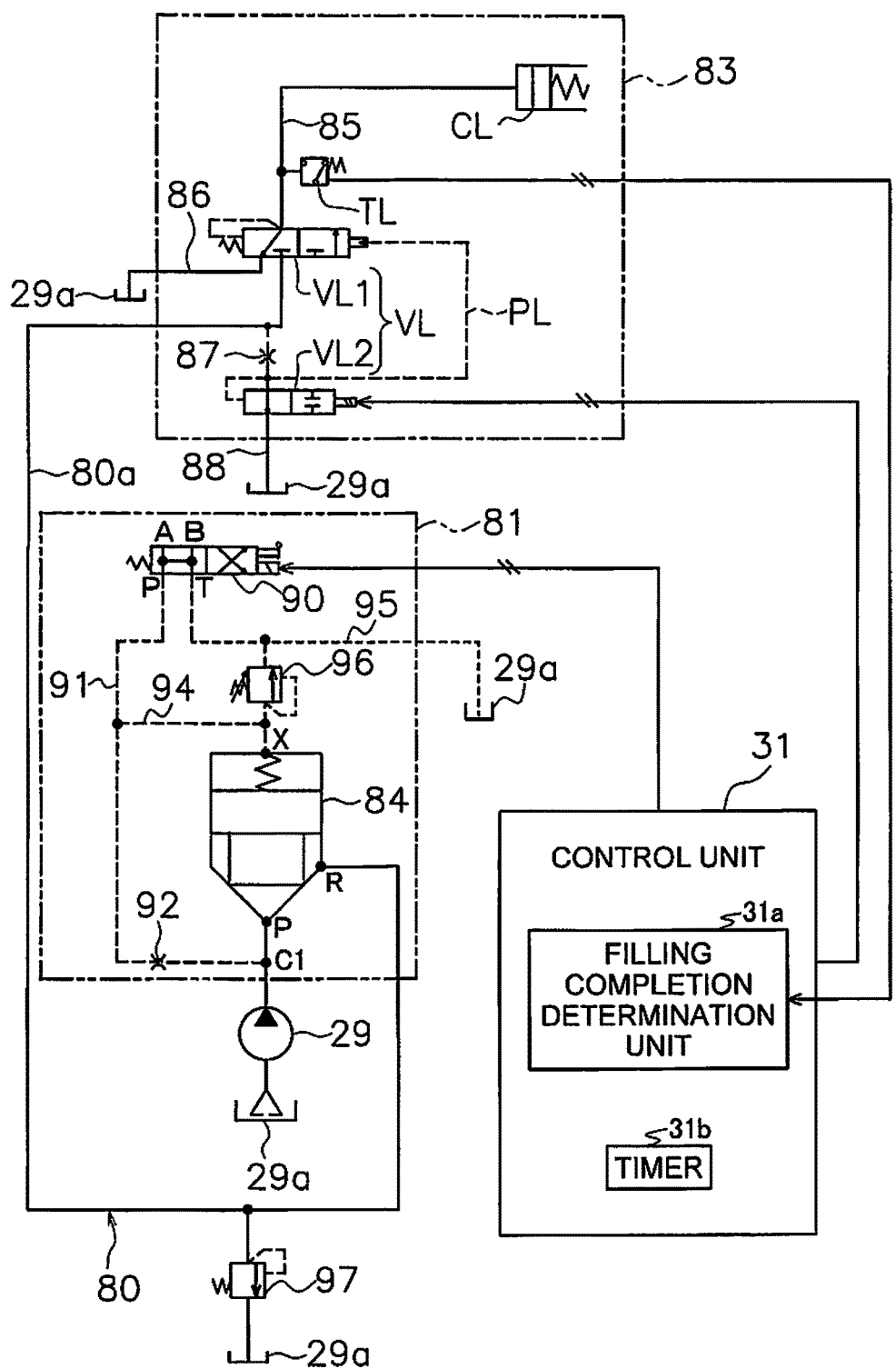
FIG. 5 is a figure showing the details of an hydraulic oil supply circuit and of an hydraulic oil warming circuit.

Next, the details of the hydraulic oil supply circuit 80 and of the hydraulic oil warming circuit 81 will be explained. FIG. 5 is a figure showing the details of the hydraulic oil supply circuit 80 and of the hydraulic oil warming circuit 81 according to this exemplary embodiment. In FIG. 5, as one example, the clutch CL is shown, and the clutch control valve VL and the pressure switch TL that are included in the clutch circuit 83 of this clutch CL are also shown. It may be considered that the clutch circuits for the other clutches are the same as this clutch circuit 83.

The clutch circuit 83 comprises the clutch CL, the clutch control valve VL, and the pressure switch TL. The clutch control valve VL comprises a pressure control valve VL1 and an electromagnetic control valve VL2. The pressure control valve VL is a device for controlling the hydraulic pressure that is supplied to the clutch CL (in other words, for controlling its clutch pressure). The pressure control valve VL is connected to a connection circuit 80a (in other words, to the hydraulic oil supply circuit 80), to an output flow path 85, and to a drain circuit 86. The connection circuit 80a is connected to a logic valve 84 that will be described hereinafter. The output flow path 85 is connected to the clutch CL. The drain circuit 86 is connected to the hydraulic oil tank 29a. The pressure control valve VL1 adjusts the hydraulic pressure in the input flow path 80 according to the magnitude of a pilot pressure in a pilot circuit PL that is connected to the electromagnetic control valve VL2 and that will be described hereinafter, and conducts it to the output flow path 85. In other words, the pressure control valve VL1 changes the clutch pressure according to the pilot pressure that is inputted. It should be understood that, in the state in which no pilot pressure is supplied to the pressure control valve VL, the pressure control valve VL is connected to the output flow path 85 and to the drain circuit 86. Due to this, the hydraulic oil is discharged from the clutch CL and is recovered into the hydraulic oil tank 29a. It should be understood that the pilot circuit PL is connected to a pilot port of the pressure control valve VL1.

The electromagnetic control valve VL2 is a device for controlling the pilot pressure that is inputted to the pressure control valve VL1. This electromagnetic control valve VL2 is connected to the connection circuit 80a via a throttle 87. The pilot circuit PL mentioned above is connected between the electromagnetic control valve VL2 and the throttle 87. Moreover, the electromagnetic control valve VL2 is connected to the hydraulic oil tank 29a via a drain circuit 88. The electromagnetic control valve VL2 can be changed over between a connection state in which it connects together the connection circuit 80a and the drain circuit 88, and an intercepting state in which it cuts off the connection circuit 80 and the drain circuit 88 from one another. The electromagnetic control valve VL2 can change over between its connection state and its intercepting state according to the magnitude of a command current that is inputted from the control unit 31. Due to this, the electromagnetic control valve VL2 is capable of controlling the pilot pressure that is supplied to the pilot circuit PL according to the above command current.

The pressure switch TL transmits a detection signal to the filling completed determination unit 31a of the control unit 31 when the clutch CL has reached a predetermined pressure.

The hydraulic oil supply circuit 80 includes the connection circuit 80a and the transmission pump 29. This hydraulic oil supply circuit 80 also includes a relief valve 97. As mentioned above, the connection circuit 80a is connected to the clutch control valve VL and to the R port of the logic valve 84. The relief valve 97 is connected to the connection circuit 80a. When the pressure in the connection circuit 80a is greater than the cracking pressure Pc1 of the relief valve 97, the relief valve 97 connects the connection circuit 80a with the hydraulic oil tank 29a. The maximum pressure in the hydraulic oil supply circuit 80 is set by this cracking pressure Pc1.

The hydraulic oil warming circuit 81 comprises the logic valve 84, an electromagnetic valve 90, an auxiliary circuit 91, a pilot circuit 94, a drain circuit 95, and a relief valve 96. The drain circuit 95 communicates with the hydraulic oil tank 29a. According to the pilot pressure in the pilot circuit 94, the logic valve 84 either connects its input flow path (i.e., its P port) with its output flow path (i.e., its R port), or disconnects the P port from the R port. The P port is connected to a hydraulic circuit from the transmission pump 29. As described above, the R port is connected to the connection circuit 80a. The logic valve 84 includes a spring that presses a poppet toward the P port and the R port.

Now, let the port of the logic valve 84 to which the pilot circuit 94 is connected be termed the "X port", let the pressure at this X port be termed "Px", and let the pressure receiving area of the X port be termed "Ax". In a similar manner, let the pressure at the P port be termed "Pp", let the pressure receiving area of the P port be termed "Ap", let the pressure at the R port be termed "Pr", and let the pressure receiving area of the R port be termed "Ar". Moreover, let the force with which the spring presses upon the poppet be termed "Fs".

First, if Ar/Ax is a (where $0<\alpha<1$), then Ap/Ax is given by $1-\alpha$.

At this time, the pressing force Fx on the X port side is given by the following Equation #1:

$$Fx=(Ax \cdot Px)+Fs \qquad \text{(Equation \#1)}$$

And the pressing up force Fw on the P and R port sides is given by the following Equation #2:

$$Fw=(Ap \cdot Pp)+(Ar \cdot Pr)=\{(1-\alpha) \cdot Ax \cdot Pp\}+(\alpha \cdot Ax \cdot Pr) \qquad \text{(Equation \#2)}$$

When the relationship Fx<Fw is satisfied, the logic valve 84 changes from the closed state to the open state. When the relationship Fx>Fw is satisfied, the logic valve 84 changes from the open state to the closed state. Moreover, when the relationship Fx=Fw is satisfied, the valve does not move but remains in an equilibrium state.

The auxiliary circuit 91 is connected to a branch point C1 on the hydraulic oil supply circuit 80 between the transmission pump 29 and the P port of the logic valve 84, and extends to the P port of the electromagnetic valve 90. This auxiliary circuit 91 includes a throttle 92. The throttle 92 fulfills the role of preventing the poppet of the logic valve 84 operating abruptly. It should be understood that, apart from this throttle 92, the auxiliary circuit 91 could also include other throttles. The electromagnetic valve 90 connects a P port with a T port thereof, or disconnects the P port from the T port. In other words, the electromagnetic valve 90 connects the auxiliary circuit 91 with the drain circuit 95, or disconnects the auxiliary circuit 91 from the drain circuit 95. The drain circuit 95 is connected to the T port of the electromagnetic valve 90 and to the hydraulic oil tank 29a. Accordingly, when the P port and the T port of the electromagnetic valve 90 are connected, the auxiliary circuit 91 communicates with the hydraulic oil tank 29a via the electromagnetic valve 90. Upon receipt of a warming up command, the electromagnetic valve 90 cuts off communication between its P port and its T port. In other words, upon receipt of a warming up command from the control unit 31, the electromagnetic valve 90 cuts off the flow path from the auxiliary circuit 91 to the drain circuit 95.

The pilot circuit 94 branches off from the auxiliary circuit 91. In other words, the auxiliary circuit 91 is connected to the pilot circuit 94. The throttle 92 is provided in the auxiliary circuit 91 between the branch point C1 and the pilot circuit 94. The pilot circuit 94 is connected to the X port of the logic valve 84 and to the relief valve 96.

The relief valve 96 is provided between the pilot circuit 94 and the drain circuit 95. Normally, this relief valve 96 cuts off the pilot circuit 94 and the drain circuit 95 from one another. However, when the pilot pressure of the relief valve 96 (i.e. the hydraulic pressure in the pilot circuit 94) becomes greater than its cracking pressure Pc2, then the relief valve 96 connects the pilot circuit 94 with the drain circuit 95. When the P port and the T port of the electromagnetic valve 90 are connected together, the pilot pressure Px of the relief valve 96 is in the vicinity of zero, and does not reach the cracking pressure Pc2. In other words, when the electromagnetic valve 90 is not receiving a warming up command from the control unit 31, the pilot circuit 94 and the drain circuit 95 are cut off from one another. When the electromagnetic valve 90 receives a warming up command from the control unit 31, the pilot pressure Px of the relief valve 96 rises since the P port and the T port of the electromagnetic valve 90 are cut off from one another. When the pilot pressure Px reaches the cracking pressure Pc2, the pilot circuit 94 communicates with the drain circuit 95. In other words, when the electromagnetic valve 90 receives a warming up command from the control unit 31, the pilot pressure Px of the relief valve 96 rises up to its cracking pressure Pc2.

Next, the warming up mechanism will be explained in concrete terms. In the starting state of the vehicle in which warming up is to be performed, the logic valve 84 is in the closed state, so that a state is established in which no hydraulic oil is present in the hydraulic chambers of the clutches. Accordingly, Pr=0. At this time, the P port and the T port are cut off from one another, because the electromagnetic valve 90 is not receiving a warming up command. Because of this, due to the hydraulic pressure received from the transmission pump 29, Pp and Px are raised to almost the same pressure. When Px=Pc2, hydraulic oil starts to flow to the relief valve 96, and a pressure difference is established between Pp and Px due to the throttle 92. In this case, although Px does not rise above Pc2, Pp rises further. The valve opens when Pp satisfies Equation #3 below:

$$Pp>\{Px+Fs/Fx\}/(1-\alpha) \qquad \text{(Equation \#3)}$$

It should be understood that Fs/Fx in the Equation given above is a value that is substantially smaller than Px, and also that the value of a is close to zero. Accordingly, Px is a value that is slightly greater than Px.

When the logic valve 84 opens so that the P port and the R port of the logic valve 84 are connected, hydraulic oil comes to flow from the P port to the R port due to the pressure difference between them, and the hydraulic oil is warmed up due to this pressure loss. Along with the flow of hydraulic oil to the R port, the pressure Pr at the R port gradually rises. Then, when the logic valve 84 is held in an equilibrium state which is its open state, Pp reaches a value that satisfies the following Equation #4:

$$Pp=\{Px-\alpha \cdot Pr+Fs/Fx\}/(1-\alpha) \quad \text{(Equation #4)}$$

As is clear from Equation #4, if Pr rises, Pp also drops. Pr has a value that is close to Pp. At the same time, due to the logic valve 84 being open, Px rises due to the hydraulic oil that has accumulated at the X port being pressed out to the relief valve 96. Due to this, Fx becomes >Fw, and the logic valve 84 closes for a second time. When the logic valve 84 closes, Pp rises for a second time, because the hydraulic oil no longer flows from the P port to the R port. When Pp satisfies Equation #5 below, the logic valve 84 opens for a second time.

$$Pp>\{Px-\alpha \cdot Pr+Fs/Fx\}/(1-\alpha) \quad \text{(Equation #5)}$$

When the electromagnetic valve 90 receives a warming up command, due to the states described above being repeated, hydraulic oil comes to flow via the P port and the R port due to the pressure difference between them. Due to this, the hydraulic oil is steadily warmed up. When the electromagnetic valve 90 ceases to receive the warming up command, its P port and its T port are connected. In this case the value of Fx is small, since the value of Px is close to zero. Accordingly Fx becomes <Fw, and the logic valve 84 is continuously in the open state. In this case no pressure loss takes place, since Pr=Pp. Accordingly, the hydraulic oil is not warmed up by the logic valve 84.

The Control Unit During Warming of the Hydraulic Oil

Figure 6:
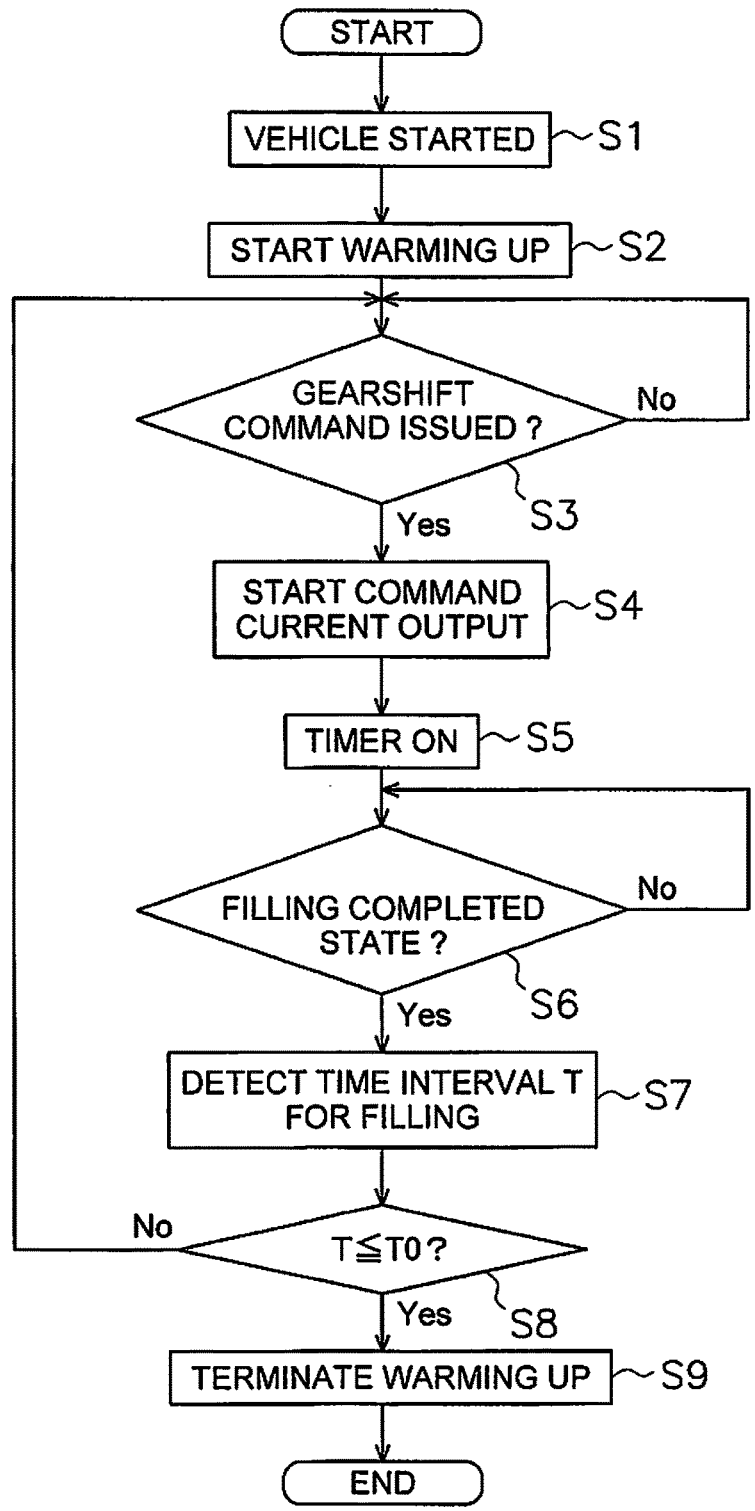
FIG. 6 is a flow chart showing the details of control when the hydraulic oil is being warmed up.
Figure 7A:
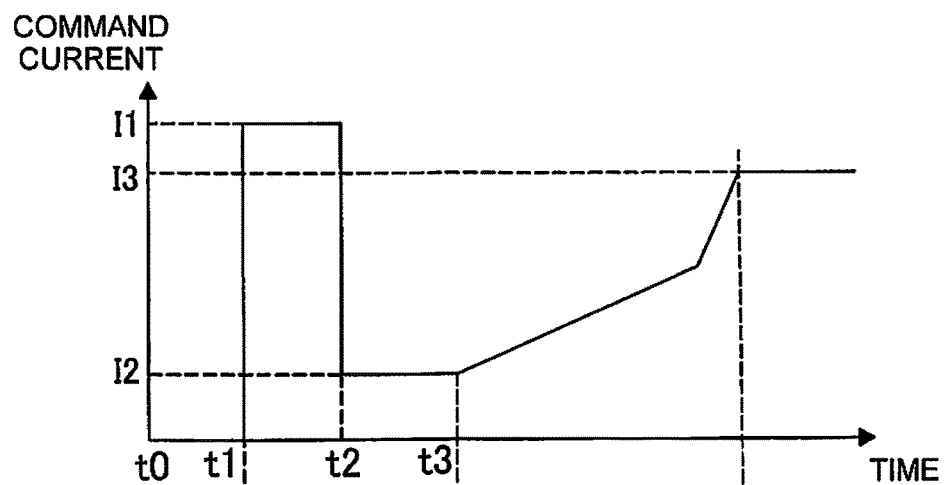
FIGS. 7A and 7B are a pair of timing charts showing, during changing over of hydraulic clutches, change of command currents to their clutch control valves and change of their clutch pressures.
Figure 7B:
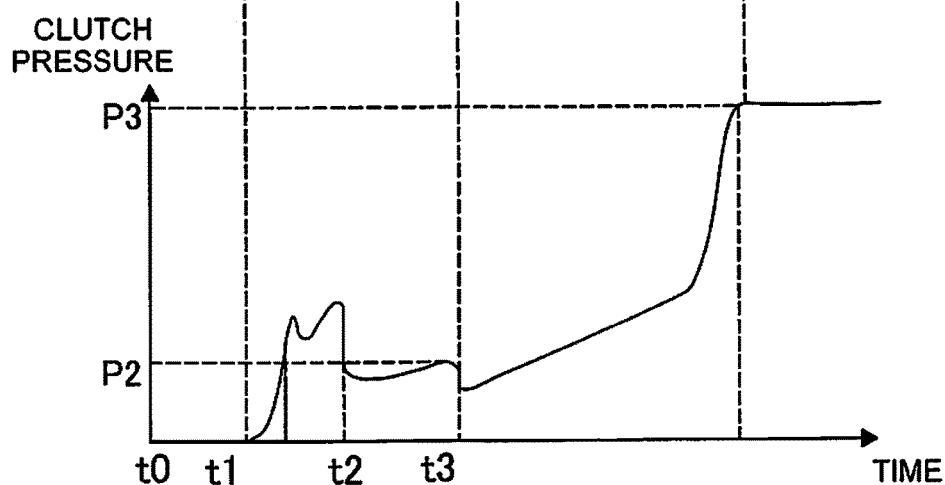

In the following, the control performed by the control unit 31 during warming up of the hydraulic oil will be explained with reference to FIG. 6, FIG. 7A and FIG. 7B. FIG. 6 is a flow chart showing the details of the control that is performed during warming up of the hydraulic oil. FIG. 7A is a timing chart showing change of the command currents to the clutch control valves VF, VR, VH, VL, Vm1, and Vm2 during changeover of the hydraulic clutches CF, CR, CH, CL, Cm1, and Cm2. FIG. 7B is a timing chart showing change of the clutch pressures of the hydraulic clutches CF, CR, CH, CL, Cm1, and Cm2 during this changeover.

First, in a step S1 the work vehicle 1 is started by key actuation by the operator or the like. Next in a step S2 the work vehicle 1 starts warming up the hydraulic oil. In concrete terms, the control unit 31 outputs a warming up command for causing the warming up function for the hydraulic oil to be performed to the hydraulic oil warming circuit 81 or to the hydraulic oil supply circuit 80. In other words, the control unit 31 controls the hydraulic oil warming circuit 81 by sending a warming up command thereto. In more detail, the control unit 31 outputs a warming up command to the electromagnetic valve 90. Due to this, the P port and the T port of the electromagnetic valve 90 are disconnected from one another. As a result, a pressure loss of the hydraulic oil is generated in the logic valve 84, and the temperature of the hydraulic oil rises. In other words, upon receipt of the warming up command, the hydraulic oil warming circuit 81 causes a pressure loss to be generated in a flow path for the hydraulic oil, so that the hydraulic oil is warmed up.

Next in a step S3 the control unit 31 determines whether or not a gearshift command has been issued. A gearshift command is issued when, according to the engine rotational speed, the control unit 31 has determined that the speed stage of the transmission 24 is to be changed over, or when the operator has manually commanded speed changing by actuating a gearshift operating member (not shown in the figures). When a gearshift command has been issued, then the flow of control proceeds to a step S4. Here, the time point at which the gearshift command is issued is shown in FIGS. 7A and 7B as t0.

In the step S4, the control unit starts output of command currents to the clutch control valves VF, VR, VH, VL, Vm1, and Vm2. Here, the time point at which the output of command currents is started is shown in FIGS. 7A and 7B as t1. At the time point t1 in FIG. 7A, command currents having a predetermined trigger command value I1 are outputted to the clutch control valves VF, VR, VH, VL, Vm1, and Vm2. These trigger commands are maintained from the time point t1 until the time point t2. Due to this, during the interval from the time point t1 to the time point t2, hydraulic oil is supplied to the clutches CF, CR, CH, CL, Cm1, and Cm2 at a comparatively large flow rate, so that, as shown in FIG. 7B, the clutch pressures increase somewhat. However, at this time point the hydraulic chambers of the clutches CF, CR, CH, CL, Cm1, and Cm2 are not yet filled.

Then in a step S5 the timer 31b is started at the time point t1, and measurement is started of the time interval T until the hydraulic chambers of the clutches CF, CR, CH, CL, Cm1, and Cm2 are filled with hydraulic oil. From this point, the command currents reduce to a predetermined set constant current value I2 at the time point t2 at which a predetermined time period has elapsed from the start of output of the trigger command. Then the command currents are kept at this set constant current value I2 until it is determined in a step S6 that the filling completed state has been established. Due to this, the flow rate of the hydraulic oil that is supplied to the clutches CF, CR, CH, CL, Cm1, and Cm2 is reduced, and, as shown in FIG. 7B, the clutch pressures become smaller than during the interval from the time point 1 until the time point t2.

In the step S6, the control unit 31 (in more detail, the filling completion determination unit 31a) determines whether or not the filling completed state has been established. Here, when the detection signals from the pressure switches TF, TR, TH, TL, Tm1, and Tm2 have been received, the filling completed determination unit 31a determines that the filling completed state has been established. When the clutch pressures reach a predetermined clutch full pressure P2, as shown at the time point t3, detection signals are transmitted to the filling completion determination unit 31a, which thus determines that the filling completed state has been established. When it has been determined that the filling completed state has been established, the flow of control proceeds to a step S7.

In the step S7, the time interval T until the hydraulic chambers of the clutches CR, CH, CL, Cm1, and Cm2 are filled with hydraulic oil is detected with the timer 31b. In the example of FIGS. 7A and 7B, T=t3−t1. And, subsequent to the time point t3, the buildup of the clutches CR, CH, CL, Cm1, and Cm2 is started.

Then in a step S8, the control unit 31 determines whether the time interval T that has been measured is less than or equal to a predetermined time interval T0. If the time interval T is less than or equal to T0 (YES in the step S8), then the work vehicle 1 terminates the warming up of the hydraulic oil. In concrete terms, the control unit 31 ends the output of the warming up command to the hydraulic oil warming circuit 81 or to the hydraulic oil supply circuit 80. In more detail, the control unit 31 terminates the output of the warming up command to the electromagnetic valve 90. Due to this, the P port and the T port of the electromagnetic valve 90 are connected. Due to this, the logic valve 84 goes into the perfectly open state, and, because the pressure difference between the P port and the R port disappears, there is no further warming up of the hydraulic oil, which flows to the clutches.

When the time interval T is longer than T0 (NO in the step S8), then the flow of control returns to the step S3. In other words, the control unit 31 continues to output the warming up command to the hydraulic oil warming circuit 81 or to the hydraulic oil supply circuit 80. In more detail, the control unit 31 continues the output of the warming up command to the electromagnetic valve 90. Due to this, the warming up of the hydraulic oil continues to be performed.

Another Hydraulic Oil Supply Circuit and Another Hydraulic Oil Warming Circuit

Figure 8:
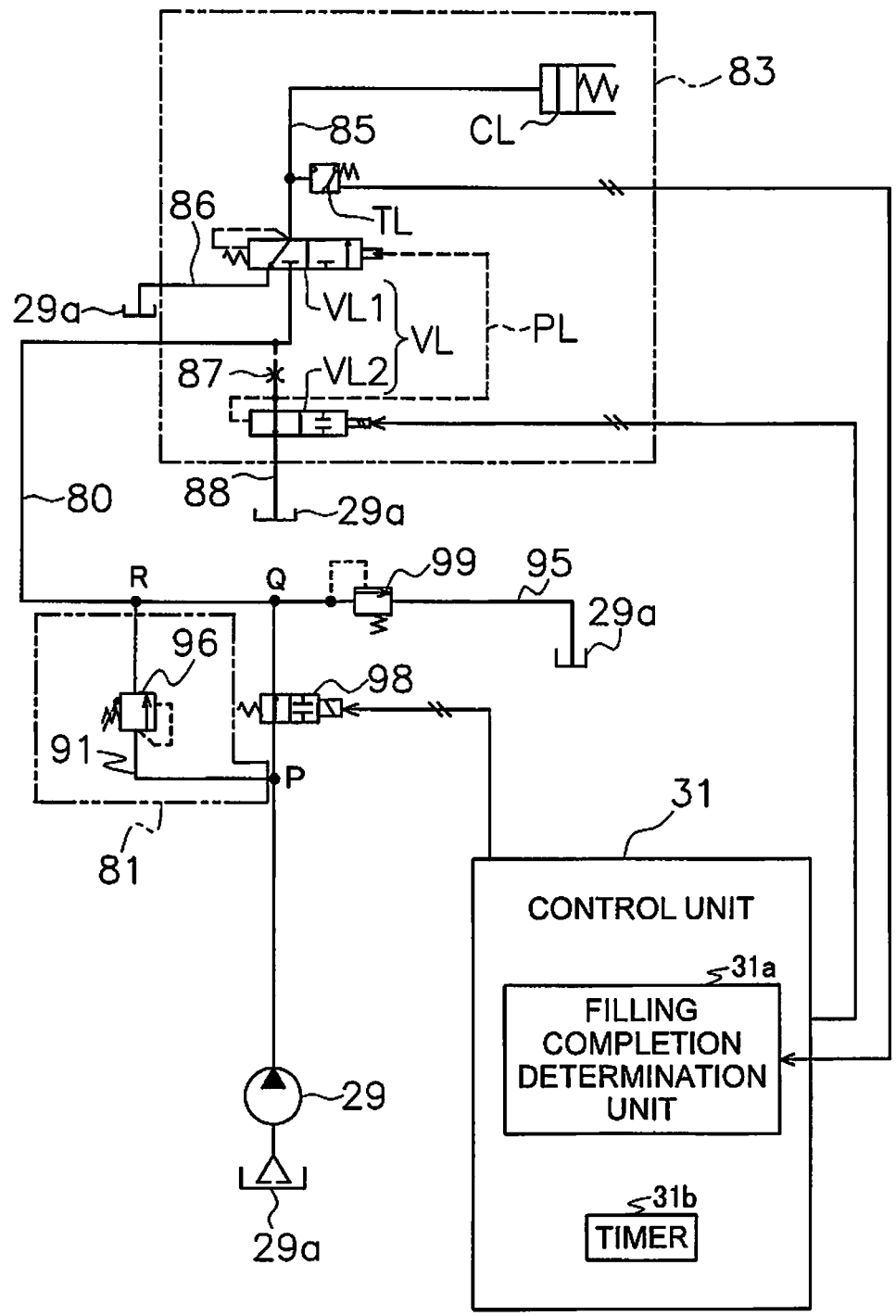
FIG. 8 is a figure showing the details of another hydraulic oil supply circuit and of another hydraulic oil warming circuit.

Apart from the structures thereof shown in FIG. 5, the hydraulic oil supply circuit 80 and the hydraulic oil warming circuit 81 could be varied in many ways. A representative variant embodiment will now be described with reference to FIG. 8. In FIG. 8, the same reference symbols will be appended to structural elements that are the same as ones in FIG. 5, and detailed explanation thereof will be omitted.

In the variant embodiment of FIG. 8, the hydraulic oil supply circuit 80 extends from the transmission pump 29 up to the clutch circuit 83, via connection portions P, Q, and R in that order. The hydraulic oil supply circuit 80 includes an on-off valve 98. Moreover, the hydraulic oil warming circuit 81 includes an auxiliary circuit 91 and a relief valve 96. The auxiliary circuit 91 branches off from the hydraulic oil supply circuit 80 at the branch point P of the hydraulic oil supply circuit 80, and extends up to the branch point R. The relief valve 96 is provided upon the auxiliary circuit 91. The relief valve 96 is provided in parallel with the on-off valve 98. The relief valve 96 normally intercepts the auxiliary circuit 91. However, when the pilot pressure of the relief valve 96 (i.e., the hydraulic pressure at the branch point P) exceeds the cracking pressure Pc3, the relief valve 96 opens the auxiliary circuit 91. The hydraulic oil supply circuit 80 may also include a drain circuit 95 and a relief valve 99. The drain circuit 95 is connected to the hydraulic oil supply circuit 80 (at the branch point Q) and to the hydraulic oil tank 29a. The relief valve 99 is provided in the drain circuit 95. In other words, the hydraulic oil supply circuit 80 is connected with the hydraulic oil tank 29a via the relief valve 99. The relief valve 99 fulfills the role of protecting the clutch circuit 83, so that hydraulic pressure higher than the cracking pressure Pc4 of the relief valve 99 is not applied to the clutch circuit 83.

The on-off valve 98 is provided upon the hydraulic oil supply circuit 80. This on-off valve 98 goes into the on state when no warming up command is being received from the control unit 31. In other words, the on-off valve 98 connects the branch point P with the branch point Q.

The on-off valve 98 goes into the off state upon receipt of a warming up command from the control unit 31. In other words, the on-off valve 98 cuts off communication between the branch point P and the branch point Q. Due to this, the hydraulic oil flows via the relief valve 96. When the hydraulic oil passes through the relief valve 96, a pressure loss of the hydraulic oil is caused, so that the temperature of the hydraulic oil is raised. In other words, upon receipt of a warming up command, the hydraulic oil warming circuit 81 causes a pressure loss to be generated in a flow path for hydraulic oil, so that the hydraulic oil is warmed up. The hydraulic oil warming circuit 81 flows the hydraulic oil to the hydraulic oil supply circuit 80 via the relief valve 96.

In the control during warming up of the hydraulic oil according to this variant embodiment, only the two facts (1) that, in the step S2, the control unit 31 outputs a warming up command to the on-off valve 98, and (2) that, in the step S9, the control unit 31 stops outputting this warming up command to the on-off valve 98, are different from the control during warming up of the hydraulic oil according to the hydraulic circuit shown in FIG. 5.

The work vehicle 1 according to this exemplary embodiment has the following characteristic features.

In the work vehicle 1, the control unit 31 measures the time interval T after a gearshift command, or after the start of output of command currents to the clutch control valves VF, VR, VL, VH, Vm1, and Vm2, until the filling completed state is established. When this time interval T is longer than a predetermined time interval T0, then the control unit 31 determines that the viscosity of the hydraulic oil is high and that the hydraulic oil temperature is low, and the hydraulic oil warming up circuit 81, which is different from a torque converter, performs warming up of the hydraulic oil. Consequently, this work vehicle 1 is able to raise the temperature of the hydraulic oil of the clutches CF, CR, CL, CH, Cm1, and Cm2 when the work vehicle is started, even though the work vehicle 1 is not equipped with a torque converter. Moreover, since the work vehicle 1 determines whether or not warming up is necessary without utilizing any temperature sensor for measuring the temperature of the hydraulic oil, accordingly it is possible to reduce the number of components of the work vehicle 1, thereby achieving a reduction in cost.

The hydraulic oil warming circuit 81 includes the logic valve 84 and the pilot circuit 94. Accordingly, the hydraulic oil warming circuit 81 is not a torque converter. Moreover, upon receipt of a warming up command, the hydraulic oil warming circuit 81 raises the hydraulic pressure of the pilot circuit 94, and thereby creates a pressure difference (Pp−Pr) between the hydraulic pressure Pp at the P port of the logic valve 84 and the hydraulic pressure Pr at its R port. Due to this, a pressure loss of the hydraulic oil takes place when the hydraulic oil passes through the logic valve 84, and thus it is possible to raise the temperature of the hydraulic oil.

The hydraulic oil warming circuit 81 comprises the drain circuit 95, the electromagnetic valve 90, the auxiliary circuit 91, and the relief valve 96. The auxiliary circuit 91 is connected to the branch point C1 of the hydraulic oil supply circuit between the transmission pump 29 and the P port of the logic valve 84, and to the pilot circuit 94. Moreover, the relief valve 96 is provided between the pilot circuit 94 and the drain circuit 95. Upon receipt of a warming up command from the control unit 31, the electromagnetic valve 90 cuts off the flow path from the auxiliary circuit 91 to the drain circuit 95. At this time, the hydraulic pressure Px in the pilot circuit 94 is raised to the cracking pressure Pc2 of the relief valve 96. When no warming up command is received from the control unit 31, the electromagnetic valve 90 connects the auxiliary circuit 91 with the hydraulic oil tank 29a. At this time, the hydraulic pressure Px in the pilot circuit 94 becomes almost zero. Accordingly, it is possible to control the hydraulic pressure in the pilot circuit 94 with the warming up command from the control unit 31.

The hydraulic oil warming circuit 81 comprises the relief valve 96 that is provided in parallel with the on-off valve 98. Accordingly, the hydraulic oil warming circuit 81 is not a torque converter. Due to the on-off valve 98 going into the off state upon receipt of a warming up command, the hydraulic oil warming circuit 81 flows hydraulic oil to the hydraulic oil supply circuit 80 via the relief valve 96. Due to this, when the hydraulic oil flows through the relief valve 96, a pressure loss takes place in this hydraulic oil, so that it is possible to warm up this hydraulic oil.

The pressure switches TF, TR, TH, TL, Tm1, and Tm2 are provided that transmit detection signals to the filling completed determination unit 31a when the clutch pressures of the hydraulic clutches CF, CR, CH, CL, Cm1, and Cm2 reach a predetermined pressure. Due to this, the timer 31b is able accurately to measure the time interval until the hydraulic oil fills up the hydraulic chambers of the hydraulic clutches CF, CR, CH, CL, Cm1, and Cm2.

While an exemplary embodiment of the present invention has been explained above, the present invention is not to be considered as being limited to the embodiment described above; various changes could be made thereto, provided that the scope of the present invention is not departed from.

In the exemplary embodiments described above, the establishment of the filling completed state was detected by the pressure switches TF, TR, TH, TL, Tm1, and Tm2. However, instead of the pressure switches TF, TR, TH, TL, Tm1, and Tm2, it would also be acceptable to arrange to provide sensors that measure the hydraulic pressures in the hydraulic chambers of the hydraulic clutches CF, CR, CH, CL, Cm1, and Cm2 and to transmit the hydraulic pressures that have been measured by those sensors to the filling completion determination unit 31a, and to arrange for the filling completed determination unit 31a to determine that the filling completed state has been established when the hydraulic pressures that have been transmitted thereto have reached the predetermined value P2 (refer to FIG. 7B) after the time point t2. Due to this, it would be possible for the timer 31b accurately to measure the time interval T until the hydraulic oil has filled up the hydraulic chambers of the hydraulic clutches CF, CR, CH, CL, Cm1, and Cm2

Moreover, while in the exemplary embodiments described above T was obtained by T=t3−t1, it would also be acceptable to arrange for T to be obtained by T=t3−t0. In other words, it would be acceptable for the timer 31b to measure the time interval from when the gearshift command is issued until the hydraulic oil fills the hydraulic chambers of the clutches CF, CR, CH, CL, Cm1, and Cm2, and, when this time interval is longer than a predetermined time interval, for the control unit 31 to perform control by outputting a warming up command to the hydraulic oil warming circuit 81 or to the hydraulic oil supply circuit 80.

Furthermore, in the exemplary embodiments described above, it would also be acceptable additionally to provide a lubrication pump that discharges hydraulic oil for lubricating the transmission 24.

Yet further, the exemplary embodiments described above are not limited in their applicability to an EMT; it would be possible to apply any of them to an HMT or the like. In this case, the first motor MG1 would function both as a hydraulic pressure motor and as a hydraulic pressure pump. Moreover, the second motor MG2 would also function both as a hydraulic pressure motor and as a hydraulic pressure pump. Yet further, the third motor MG3 would also function both as a hydraulic pressure motor and as a hydraulic pressure pump. The first motor MG1, the second motor MG2, and the third motor MG3 would be variable capacity type pump/motors whose capacity would be controlled by the control unit 31.

The structure of the transmission 24 is not to be considered as being limited to the structures of the exemplary embodiments described above. For example, the linking and the configuration of the elements of the two planetary gear mechanisms 68 and 69 is not to be considered as being limited to the linking and the configuration of the embodiments described above. Also, the number of planetary gear mechanisms is not limited to being two. For example, it would be acceptable for the transmission to include only one planetary gear mechanism. Moreover, the number of motors is not limited to being three. It would be possible to provide one, two, or four or more motors. For example, the third motor MG3 could be omitted.

According to exemplary embodiments of the present invention, without employing a torque converter, it is possible to provide a work vehicle that is capable of raising the temperature of the hydraulic oil of a clutch when the work vehicle is started.

The invention claimed is:

1. A work vehicle, comprising:
an engine;
a transmission configured to convert a driving force from the engine;
a hydraulic oil supply circuit configured to supply hydraulic oil to the transmission;
a hydraulic oil warming circuit configured to warm up the hydraulic oil; and
a control unit configured to control the transmission, the hydraulic oil supply circuit, and the hydraulic oil warming circuit,
the transmission including
a hydraulic clutch; and
a clutch control valve configured to control a pressure of the hydraulic oil supplied to the hydraulic clutch according to a command from the control unit, the control unit being configured to output a warming up command to cause the warming up function to be performed when the control unit determines that the temperature of the hydraulic oil is low; and
the hydraulic oil warming circuit being configured to warm up the hydraulic oil by causing a pressure loss in a flow path for the hydraulic oil.

2. The work vehicle according to claim 1, wherein
the hydraulic oil supply circuit includes
a connection circuit connected to the clutch control valve; and
a transmission pump,
the hydraulic oil warming circuit includes
a logic valve; and
a pilot circuit for the logic valve,
the logic valve includes
a P port connected to a hydraulic circuit from the transmission pump; and
an R port connected to the connection circuit,
upon receipt of the warming up command, the hydraulic oil warming circuit is configured to raise the hydraulic pressure in the pilot circuit, generate a pressure difference between the hydraulic pressure at the P port and the hydraulic pressure at the R port, and warm up the hydraulic oil by flowing the hydraulic oil from the P port to the R port using the pressure loss due to the pressure difference.

3. The work vehicle according to claim 2, the hydraulic oil warming circuit including
a drain circuit;
an auxiliary circuit connected to the P port and to the pilot circuit;
an electromagnetic valve configured to connect the auxiliary circuit with the drain circuit or disconnect the auxiliary circuit from the drain circuit; and
a relief valve disposed between the pilot circuit and the drain circuit;
upon receipt of the warming up command, the electromagnetic valve being configured to intercept a flow path to the drain circuit from the auxiliary circuit, and raise the hydraulic pressure in the pilot circuit to the cracking pressure of the relief valve.

4. The work vehicle according to claim 1, wherein
the hydraulic oil supply circuit includes an on-off valve;
the hydraulic oil warming circuit includes a relief valve provided in parallel with the on-off valve; and
the on-off valve is configured to go into the off state upon receipt of the warming up command such that the hydraulic oil warming circuit causes the hydraulic oil to flow to the hydraulic oil supply circuit via the relief valve.

5. The work vehicle according to claim 1, wherein
the control unit includes
   a filling completion determination unit configured to determine whether or not a filling completed state that the hydraulic oil has been completely filled into a hydraulic chamber of the hydraulic clutch is established; and
   a timer configured to measure the time interval after a gearshift command, or after the start of output of a command current to the clutch control valve, until the filling completed state is established, the control unit is being configured to determine that the hydraulic oil temperature is low if when the time interval measured by the timer is longer than a predetermined time interval.

6. The work vehicle according to claim 5, wherein
the transmission includes a pressure switch configured to transmit a detection signal to the filling completion determination unit when the clutch pressure of the hydraulic clutch has reached a predetermined pressure,
the filling completion determination unit is configured to determine that the filling completed state is established when the detection signal is received.

7. The work vehicle according to claim 5, wherein
the transmission includes a hydraulic pressure sensor configured to measure the hydraulic pressure in the hydraulic chamber of the hydraulic clutch, and transmit the measured hydraulic pressure to the filling completion determination unit,
the filling completion determination unit being configured to determine that the filling completed state is established when the hydraulic pressure transmitted from the hydraulic pressure sensor reaches a predetermined value.

8. The work vehicle according to claim 1, the transmission further including
   an input shaft;
   an output shaft;
   a gear mechanism configured to transmit rotation of the input shaft to the output shaft, the gear mechanism including a planetary gear mechanism; and
   a motor connected to a rotating element of the planetary gear mechanism,
   the transmission being configured such that a rotational speed ratio of the output shaft with respect to the input shaft is changed according to a change of a rotational speed of the motor.

9. The work vehicle according to claim 7, the transmission further including
   an input shaft;
   an output shaft;
   a gear mechanism configured to transmit rotation of the input shaft to the output shaft, the gear mechanism including a planetary gear mechanism; and
   a motor connected to a rotating element of the planetary gear mechanism,
   the transmission being configured such that a rotational speed ratio of the output shaft with respect to the input shaft is changed according to a change of a rotational speed of the motor.

* * * * *